(12) United States Patent
Qi et al.

(10) Patent No.: US 12,124,936 B2
(45) Date of Patent: Oct. 22, 2024

(54) INTEGER-BASED FUSED CONVOLUTIONAL LAYER IN A CONVOLUTIONAL NEURAL NETWORK

(71) Applicant: Black Sesame International Holding Limited, Santa Clara, CA (US)

(72) Inventors: Zheng Qi, Cupertino, CA (US); Qun Gu, San Jose, CA (US); Zheng Li, Cupertino, CA (US); Chenghao Zhang, Sunnyvale, CA (US); Tian Zhou, San Mateo, CA (US); Zuoguan Wang, Los Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 962 days.

(21) Appl. No.: 17/068,263

(22) Filed: Oct. 12, 2020

(65) Prior Publication Data

US 2022/0114413 A1    Apr. 14, 2022

(51) Int. Cl.
*G06F 7/499*   (2006.01)
*G06F 5/01*    (2006.01)
(Continued)

(52) U.S. Cl.
CPC ............ *G06N 3/04* (2013.01); *G06F 5/01* (2013.01); *G06F 7/49936* (2013.01); *G06F 17/15* (2013.01); *G06F 2207/4824* (2013.01)

(58) Field of Classification Search
CPC ....... G06N 3/04; G06F 7/49936; G06F 17/15; G06F 2207/4824; G06F 7/5443; G06F 5/01
See application file for complete search history.

(56) References Cited

U.S. PATENT DOCUMENTS

| | | | | |
|---|---|---|---|---|
| 4,926,370 A | * | 5/1990 | Brown ................... | G06F 7/483 708/205 |
| 2002/0107900 A1 | * | 8/2002 | Enenkel ................ | G06F 7/483 708/497 |

(Continued)

FOREIGN PATENT DOCUMENTS

| | | |
|---|---|---|
| CN | 1178588 A | 4/1998 |
| CN | 106066783 A | 11/2016 |

(Continued)

OTHER PUBLICATIONS

Jinwei Yin, An Accelerated Design of Convolutional Neural Networks Based on Small and Medium-sized FPGAs, China Master's Theses Full-text Database, Information Technology Edition, Jan. 15, 2020.

(Continued)

*Primary Examiner* — Jyoti Mehta
*Assistant Examiner* — Huy Duong
(74) *Attorney, Agent, or Firm* — Timothy T. Wang; Ni, Wang & Massand, PLLC

(57) ABSTRACT

An example fused convolutional layer, comprising, a comparator capable of reception of a first zero point and a multiply-accumulation result, a first multiplexer coupled to the comparator, wherein the first multiplexer receives a plurality of power-of-two exponent values, a shift normalizer, coupled to the first multiplexer, wherein the shift normalizer is capable of receiving the multiply-accumulation result and the plurality of power-of-two exponent values, wherein the shift normalizer limits a quantization of the multiply-accumulation result to a power-of-two scale and a second multiplexer coupled to an output of the shift normalizer, the first multiplexer and receives a second zero point and outputs an activation.

7 Claims, 5 Drawing Sheets

(51) Int. Cl.
*G06F 17/15* (2006.01)
*G06N 3/04* (2023.01)

(56) References Cited

U.S. PATENT DOCUMENTS

| | | |
|---|---|---|
| 2017/0060532 A1 | 3/2017 | Ahmed |
| 2018/0253647 A1 | 9/2018 | Yu et al. |
| 2019/0138882 A1 | 5/2019 | Choi et al. |
| 2019/0340214 A1 | 11/2019 | Gudovskiy et al. |
| 2020/0134475 A1 | 4/2020 | Hill et al. |

FOREIGN PATENT DOCUMENTS

| | | |
|---|---|---|
| CN | 107168678 A | 9/2017 |
| CN | 108805286 A | 11/2018 |
| CN | 109840589 A | 6/2019 |
| CN | 110222815 A | 9/2019 |
| CN | 110363279 A | 10/2019 |
| CN | 110598839 A | 12/2019 |
| CN | 110837890 A | 2/2020 |
| CN | 110991630 A | 4/2020 |
| CN | 111178514 A | 5/2020 |
| CN | 111612147 A | 9/2020 |
| CN | 111667064 A | 9/2020 |
| CN | 111695671 A | 9/2020 |
| CN | 111696149 A | 9/2020 |

OTHER PUBLICATIONS

Zhou Jian, Lv Yibo, Hong Shaohua, Wang Lin, Protograph-based LDPC decoder applied to magnetic recording channel, Journal of Chongqing University of Posts and Telecommunications( Natural Science Edition), vol. 25 No.6, Dec. 2013.

\* cited by examiner

INTEGER-BASED FUSED CONVOLUTIONAL LAYER IN A CONVOLUTIONAL NEURAL NETWORK

BACKGROUND

Technical Field

The instant disclosure is related to convolutional neural networks and specifically to providing an integer-based fused convolutional layer in a convolutional neural network.

BACKGROUND

Currently, deep convolution neural network (DCNN) are utilized in smart edge devices. To achieve real-time and low power in DCNN inference, the models are compressed in terms of memory size and the number of computation operation when deployed in limited-resource devices.

Most current mechanisms require a non-trivial normalization stages before and after the convolution operation. The hardware cost of the normalization stage exceeds that of the convolution operation. A possible solution is presented for quantization implementation that utilizes only an extra shifter for the normalization, thus significantly reducing the hardware cost. The proposed solution transforms the multiplication-based normalization into a shift-only one by limiting the quantization in a power-of-two scale. The proposed solution supports asymmetric quantization without an extra adder for the zero-point calibration by fusing it to the convolution bias-add operation. A quantization library enables zero-numerical-error hardware deployment.

SUMMARY

An example fused convolutional layer, comprising at least one of, a comparator capable of reception of a first zero point and a multiply-accumulation result, a first multiplexer coupled to the comparator, wherein the first multiplexer receives a plurality of power-of-two exponent values, a shift normalizer, coupled to the first multiplexer, wherein the shift normalizer is capable of receiving the multiply-accumulation result and the plurality of power-of-two exponent values, wherein the shift normalizer limits a quantization of the multiply-accumulation result to a power-of-two scale and a second multiplexer coupled to an output of the shift normalizer, the first multiplexer and receives a second zero point and outputs an activation.

An example fused convolutional method, comprising at least one of, quantizing an input tensor into a first power-of-two value, quantizing a weight tensor into a second power-of-two value, performing a convolution based on the quantized input tensor and the quantized weight tensor, quantizing a bias tensor into a third power-of-two value, bias-adding an output of the convolution and the quantized bias tensor and outputting a bias-addition, non-linearizing the output of the bias-addition and quantizing the output of the non-linearization into an activation taking a form of a fourth power-of-two value output tensor.

DESCRIPTION OF THE DRAWINGS

In the drawings:

FIG. 1 is a first example system diagram in accordance with one embodiment of the disclosure;

FIG. 2 is a second example system diagram in accordance with one embodiment of the disclosure;

FIG. 3 is an example shift-only implementation data path of the convolutional layer in accordance with one embodiment of the disclosure;

FIG. 4 is an example quantization computational graph of the quantization library in accordance with one embodiment of the disclosure; and FIG. 5 is an example method in accordance with one embodiment of the disclosure.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

FIG. 1 depicts an example hybrid computational system 100 that may be used to implement neural nets associated with the operation of one or more portions or steps of process 600. In this example, the processors associated with the hybrid system comprise a field programmable gate army (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 1:
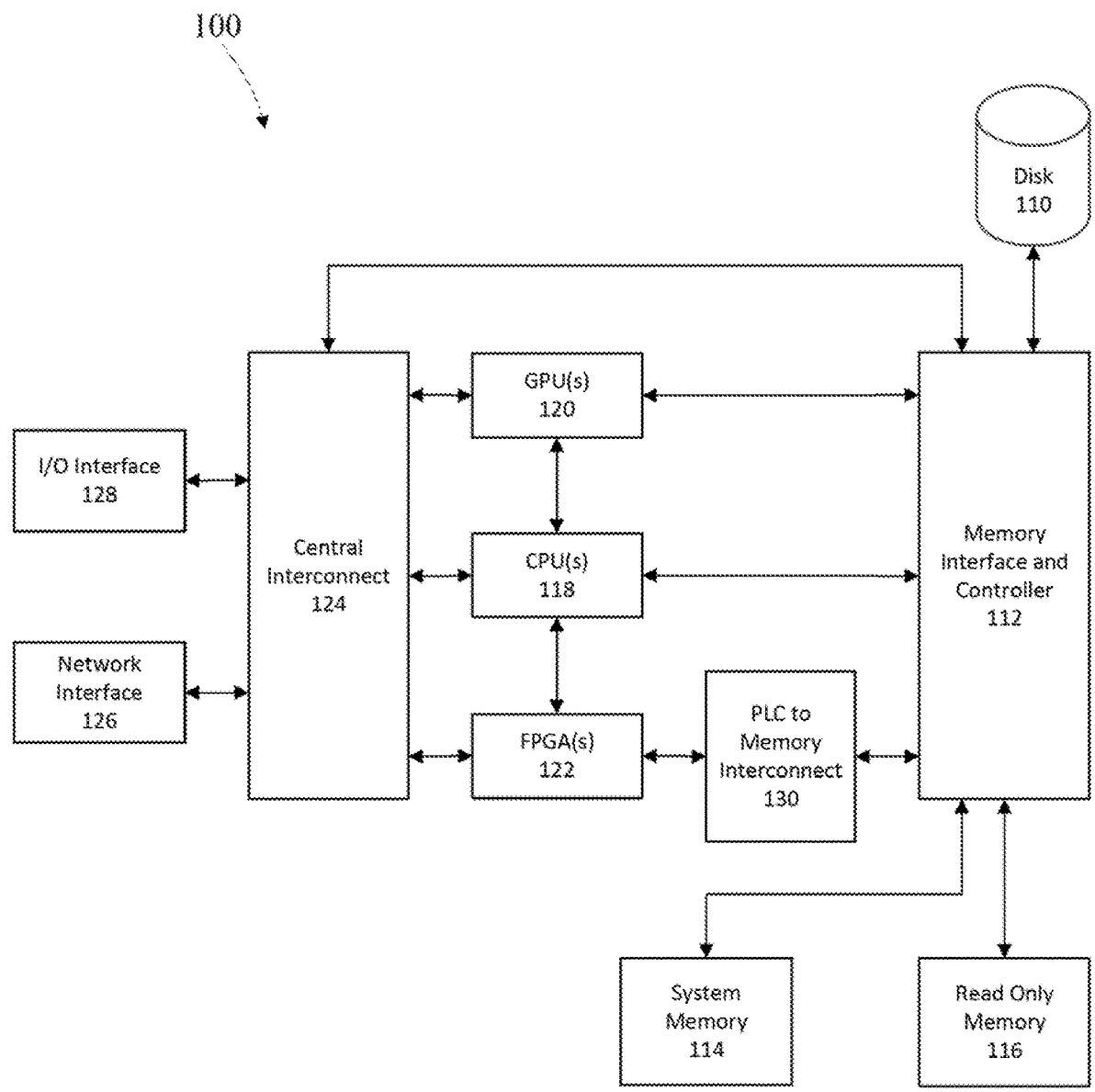

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
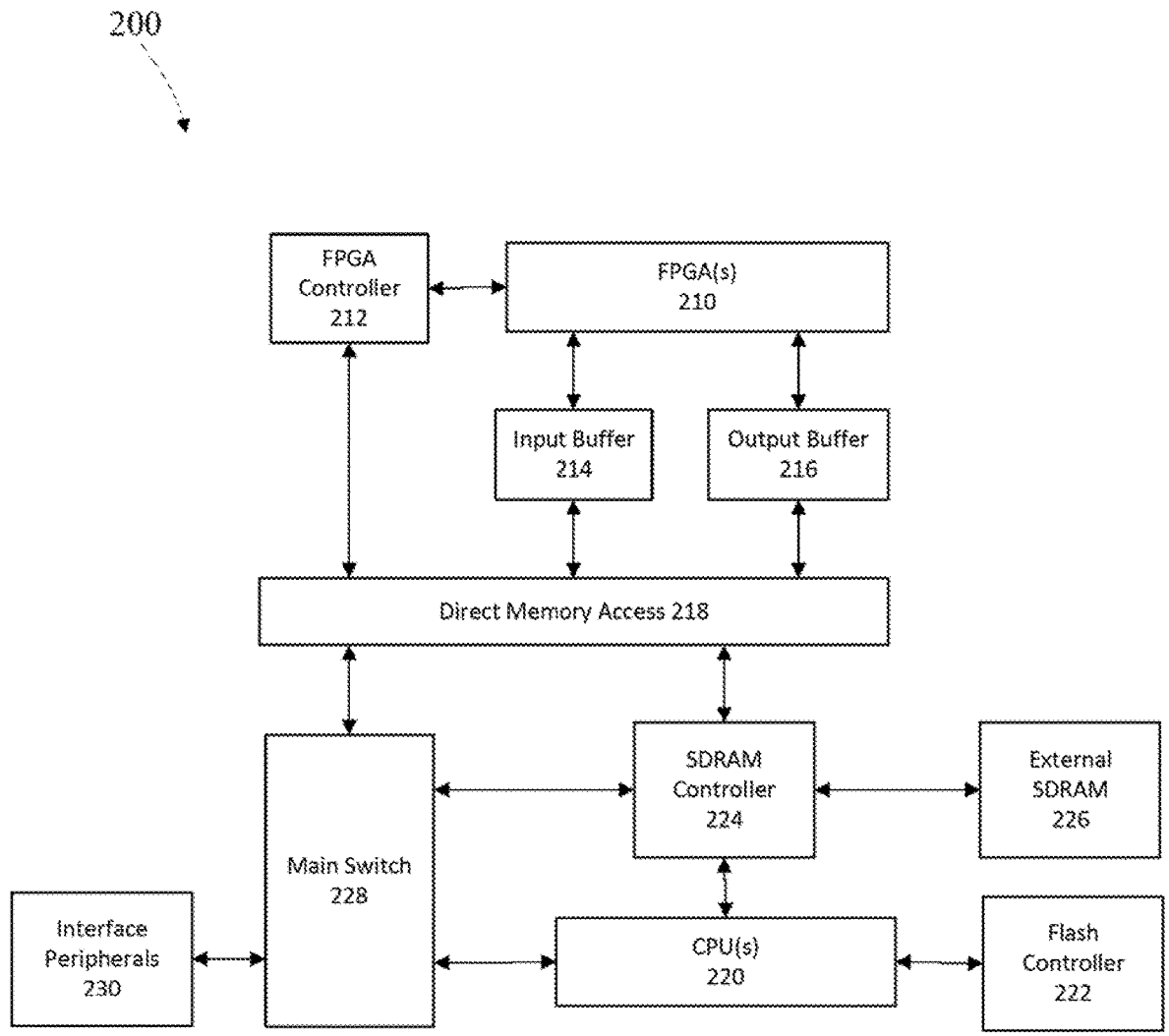

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

The disclosed quantization method and hardware implementation may allow a convolution to be determined utilizing minimal hardware resources while retaining an inference accuracy comparable to a corresponding floating-point model. Specifically, a proposed hardware implementation for the fused convolution layer operation utilizing only a shifter in the normalization stage is proposed. The proposed method and system may support multiple different quantization configurations such as symmetric or asymmetric, layer-wise or channel-wise, and multiple activation functions such as rectified linear unit (ReLU), parametric rectified linear unit (pReLU), filtered rectified linear unit (ReLUx), and hard-sigmoid. The proposed solution may provide zero-numerical-error hardware deployment by utilizing a quantization library. The library may directly quantize individual tensors in a computational graph from public deep learning (DL) frameworks without modifying the kernel implementation of operations from the original framework. This solution may provide additional observability while the bit-level equivalency in hardware deployment is attainable.

2D Convolution Layer
Floating-Point Operations
A typical 2D convolution layer in the convolutional neural network (CNN) may be described in following equations:

$$P = W * A^{i-1} + b \quad (1)$$

$$A^i = \sigma(P) \quad (2)$$

where $A^i$ is the output activation of $i^{th}$ layer in shape of $C^i \times H^i \times W^i$.

W is the weight matrix of the layer in shape of $C^i \times C^{i-1} \times K_H \times K_W$, b is the bias vector of the layer in shape of $C^i \times 1$, P is the intermediate multiply-accumulation result of the layer in shape of $C^i \times H^i \times W^i$, σ is the non-linear activation function, $C^i$ is the number of channel of $i^{th}$ layer, $H^i$, $W^i$ is the height and width of the feature map of $i^{th}$ layer,

* denotes the 2D convolution operation.

Fully-Integer-Based Operations

To limit the data precision for computation efficiency, an affine mapping is commonly used to linearly quantize the floating-point value to a finite bit-width integer representation:

$$\tilde{v} = s(\overline{v} - \overline{z}) \quad (3)$$

where $\tilde{v}$ is the dequantized value in floating point that approximate the real value v, $\overline{v}$ is the integer representation of the quantized value, (s,$\overline{z}$) are the quantization parameters where s is the normalization factor of v in floating-point format and $\overline{z}$ the zero point of $\overline{v}$ in integer format. These tuples may be computed offline.

In this document, notations with bar are integer variables and notation with a tilde are fused or approximated integer variable.

Convolution layer operations are given by Equations (1) and (2), with quantized variables and illustrate integer-based implementations. The offline-computed parameters may be in a lower-bit format to reduce model and memory footprint, the heavy computation kernel (convolution) may also be lower-bit integer-based for low-cost hardware implementation and the offline-computed parameters may be fused when possible while minimizing the induced bias in the fusion.

Plugging equation (3) into equation (1) with respective quantization parameters (s,z), the equivalent integer-based 2D convolution operation is given by:

$$\tilde{P} = s_W(\overline{W} - z_W) * s_{A^{i-1}}(\overline{A}^{i-1} - z_{A^{i-1}}) + s_b(\overline{b} - z_b) \quad (4)$$

Separating the integer operations and floating-point operations:

$$\frac{1}{s_W s_{A^{i-1}}} \tilde{P} = \quad (5)$$

$$\overline{W} * \overline{A}^{i-1} + z_W \overline{A}^{i-1} + z_{A^{i-1}} \overline{W} + z_W z_{A^{i-1}} + \frac{s_b}{s_W s_{A^{i-1}}}(\overline{b} - z_b)$$

The intermediate result of the integer-based multiply-accumulation operation is designated as $\overline{P}$:

$$\overline{P} = \overline{W} * \overline{A}^{i-1} + z_W \overline{A}^{i-1} + \tilde{b} \quad (6)$$

$$\tilde{b} = z_{A^{i-1}} \overline{W} + z_W z_{A^{i-1}} + \gamma\left(\frac{1}{s_W s_{A^{i-1}}} b\right) \quad (7)$$

Considering the final non-linear operation in equation (2) and the output expressed in quantized integer-format to cascade to the next layer:

$$\overline{A}^i = \frac{1}{s_{A^i}}\sigma(\tilde{P}) + z_{A^i} \qquad (8)$$

Most non-linear activation functions may be relaxed or approximated by a Parametric Rectifier Linear Unit (PReLU) with upper bound clamping:

$$\sigma(x) = \begin{cases} x, & \text{if } x > d \\ ax, & \text{if } x \le d \end{cases} \qquad (9)$$

Plugging equation (11) into equation (10), and rounding the remaining floating-point parts to integer or converting them to fixed-point representation yields:

$$\overline{A}^i = \begin{cases} \overline{k}_1 \overline{P} + z_{A^i}, & \text{if } P > \tilde{z} \\ \overline{k}_2 \overline{P} + z_{A^i}, & \text{if } P \le \tilde{z} \end{cases} \qquad (10)$$

$$k_1 = \frac{s_W s_{A^{i-1}}}{s_{A^i}} = \overline{k}_1 2^{n_1},$$

$$k_2 = \gamma_{p2}\left(\frac{a s_W s_{A^{i-1}}}{s_{A^i}}\right) = \overline{k}_2 2^{n_2}, \qquad (11)$$

$$\tilde{z} = \gamma\left(\frac{d}{s_W s_{A^{i-1}}}\right)$$

where γ(x) is the rounding function that rounds a floating-point value to integer, {n∈Z} and Z is the integer set.

The operation is formulated as in equation (6) and (10).

The parameters are $\{\overline{W}, z_W, z_{A^i}, \overline{b}, \overline{k}_1, n_1, \overline{k}_2, n_2, \tilde{z}\}$, where $\{\overline{W}, z_W, z_{A^i}\}$ may be in lower-bit format (8-bit or lower) to reduce model footprint and $\{\overline{b}, \overline{k}_1, \overline{k}_2, \tilde{Z}\}$ may be in higher-bit format (16-bit or higher) to maintain model accuracy.

$z_W \overline{A}^{i-1}$ may be computed online, as $\overline{A}^{i-1}$ and dynamically depends on the input data. $\overline{b}$ may be computed offline as terms may be determined offline. $\overline{b}$ may be rounded to integer where $\{s_b, s_W, s_{A^{i-1}}\}$ are in a floating-point format. The precision of $\overline{b}$ may be high enough that it may summarize the terms without excessive numerical error.

Shift-Only Normalization

By constraining the floating-point scaling factor s and a to power-of-two values:

$$s = 2^{n_s}, n_s \in Z \qquad (12)$$

The normalization stage may be simplified as:

$$\overline{A}^i = \begin{cases} 2^{-n_1}\overline{P} + z_{A^i}, & \text{if } P > \tilde{z} \\ 2^{-n_2}\overline{P} + z_{A^i}, & \text{if } P \le \tilde{z} \end{cases} \qquad (13)$$

$$n_1 = n_{A^i} - n_{A^{i-1}} - n_W, \qquad (14)$$
$$n_2 = n_{A^i} - n_{A^{i-1}} - n_W - n_a$$

Under either one of the following conditions, the addition operation in the normalization stage may be avoided.

$z_{A^i} = 0$ indicates that activation may be symmetrically quantized.

ReLU (a=0) is used as the activation function σ(x). In this case, $z_{A^i}$ may be fused to $\overline{b}$ in the bias-add stage as:

$$\overline{b} = z_{A^{i-1}} \overline{W} + z_W z_{A^{i-1}} + \gamma(b 2^{-n_W - n_{A^{i-1}}}) + z_{A^i} 2^{n_1} \qquad (15)$$

$$\overline{A}^i = \begin{cases} 2^{-n_1}\overline{P}, & \text{if } P > \tilde{z} \\ z_{A^i}, & \text{if } P \le \tilde{z} \end{cases} \qquad (16)$$

$$\tilde{z} = \gamma(d 2^{-n_W - n_{A^{i-1}}}) + z_{A^i} 2^{n_1} \qquad (17)$$

Figure 3:
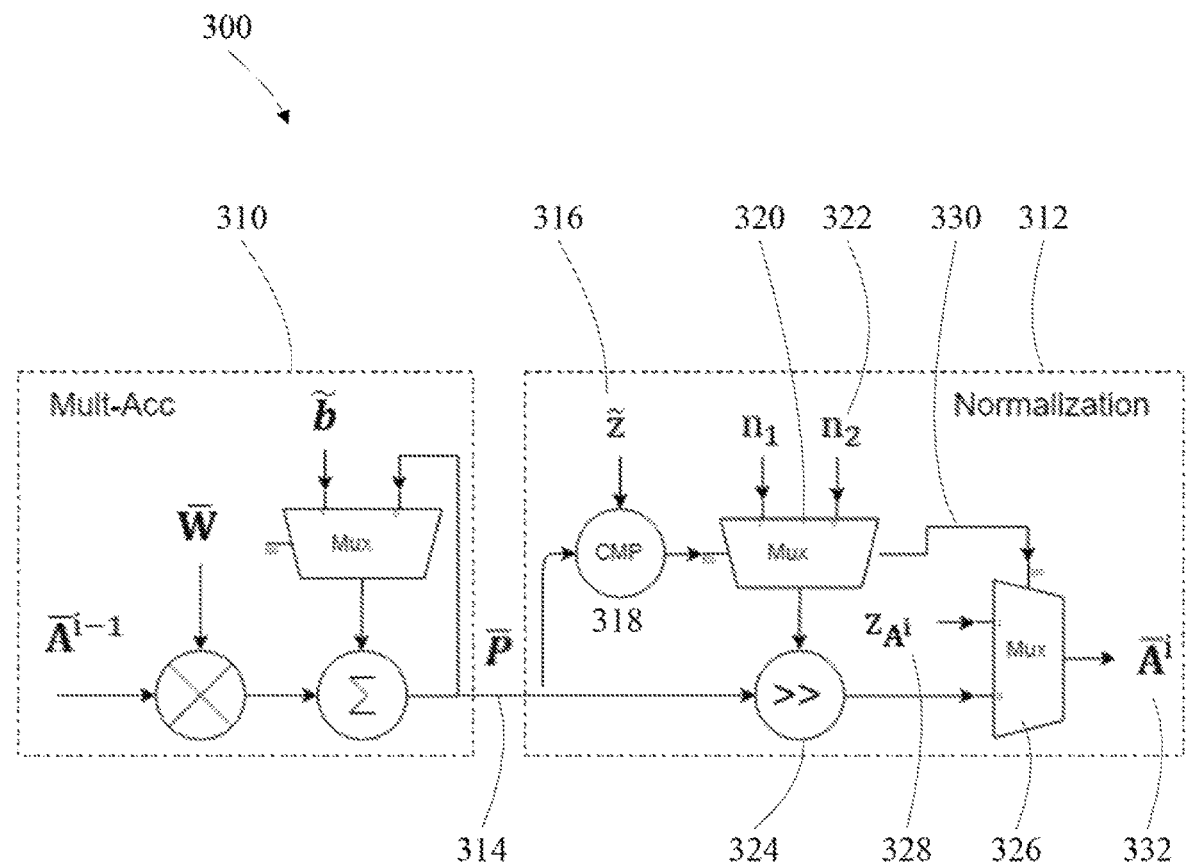

The data path is illustrated in FIG. 3. The parameters are $\{\overline{W}, z_W, z_{A^i}, \overline{b}, n_1, n_2, \tilde{z}\}$.

Accumulator precision, to simulate the precision of the mantissa of float 32, a 24-bit integer may be used for the intermediate accumulation $\overline{P}$. As long as the accumulation operation does not overflow, the result may be bit-exact compared to software quantization. This implies that the weights and input activation data may be properly normalized, which is satisfied when using a batch normalization layer in the model.

The precision of fused bias $\overline{b}$ as the bias term may be added into the accumulator, a reasonable maximum precision may be designated as 24-bit. In equation (15), terms $z_{A^{i-1}} \overline{W}$ and $z_W z_{A^{i-1}}$ are in the same scale as the accumulation result $\overline{P}$. No overflow may occur if the normalization requirement is satisfied. The $\gamma(b 2^{-n_W - n_{A^{i-1}}})$ term indicates a conversion of the original bias vector b to fixed-point and normalization on the scale of the accumulation result $\overline{P}$. When quantizing the original bias vector b in the software library, no affine mapping is needed. The fixed-point bit-precision and Q factor may be designed to maintain bit-exactness between software quasi-quantization and a hardware quantization implementation. The last term $z_{A^i} 2^{n_1}$ may be completely fused without introducing numerical error, as it remains the lower-bit precision of $z_{A^i}$.

The precision of the fused zero-point $\tilde{z}$ may impact the subsequent non-linear operations, for the entries of $\overline{P}$ close to $\tilde{z}$. The induced bias may be amplified in the output activation and may be propagated in the subsequent layers.

FIG. 3 depicts a fused convolutional layer 300, having a shift-only normalizer. A multiply-accumulate layer 300 outputs an intermediate result of the multiply-accumulate $\overline{P}$ 314 as an integer variable. The intermediate multiply-accumulate is routed to a comparator 318 that also receives a first zero point $\tilde{z}$ 316. A first multiplexer 320 is coupled to the comparator 318, the first multiplexer 320 receives multiple of power-of-two exponent values $n_i$ 322. A shift normalizer 324 which normalizes based on shift-only is coupled to the first multiplexer 320. The shift normalizer 324 receives the multiply-accumulation result 314 and the multiple power-of-two exponent values 322. The shift normalizer 324 limits a quantization of the multiply-accumulation result 314 to a power-of-two scale. A second multiplexer 326 is coupled to an output of the shift normalizer 324, the first multiplexer 320 and receives a second zero point $z_{A^i}$ 328 and outputs an activation $\overline{A}^i$ 332.

The multiply-accumulation result 314 may be an integer variable. The first zero point 316 may be fused or an approximated integer variable. The activation 332 may be an integer variable.

Various Quantization Configurations

Asymmetric quantization is supported in the proposed data path when using ReLU activation function.

Weight quantization, when quantizing weights asymmetrically, the weight may be represented with 8-bit matrix $\overline{W}$ and an extra zero-point scalar $z_W$. The zero-point scalar may increase computational costs, $z_W \overline{A}^{i-1}$, as formulated in equation (6). Utilizing the existing hardware as in FIG. 3, this part may be computed as convolution, $z_W \ddot{\mathbb{1}} * \overline{A}^{i-1}$, where $\ddot{\mathbb{1}}$ is all-ones-matrix with the same shape as $\overline{W}$. But the number of MACs operations may be double. Thus, it is recommended to avoid quantizing weight asymmetrically.

Activation functions. When using symmetric quantization or partial asymmetric quantization (asymmetric weight and symmetric activation), several activation functions are feasible: ReLU (a=0, d=0), ReLU6 (x=6×$2^{n_A n_W}$), leakyReLU (a≈0.125, d=0), pReLU (p≈$2^n$), hard-sigmoid (with slope $2^{-n}$).

Channel-wise quantization, the derivation above is based on layer-wise quantization where s and z are scalar. In many light-weight models, lower loss may be achieved in the model performance if using channel-wise quantization. In this case s and z may be 1-D vectors instead of scalars. In this case, equation (4) may not be formatted like equation (5), since matrix multiplication as it is not commutative and it is not possible to group $s_W s_{A^{i-1}}$. In the proposed implementation, channel-wise quantization may be performed in weight W while remaining layer-wise quantization in activation $A^i$. Supported configurations and limitations may be the same as above. The following offline-computed parameters $\{z_W, n_1, n_2, \tilde{z}\}$ may be vectors instead of scalars.

Bit-Exact Software Quantization Library

Figure 4:
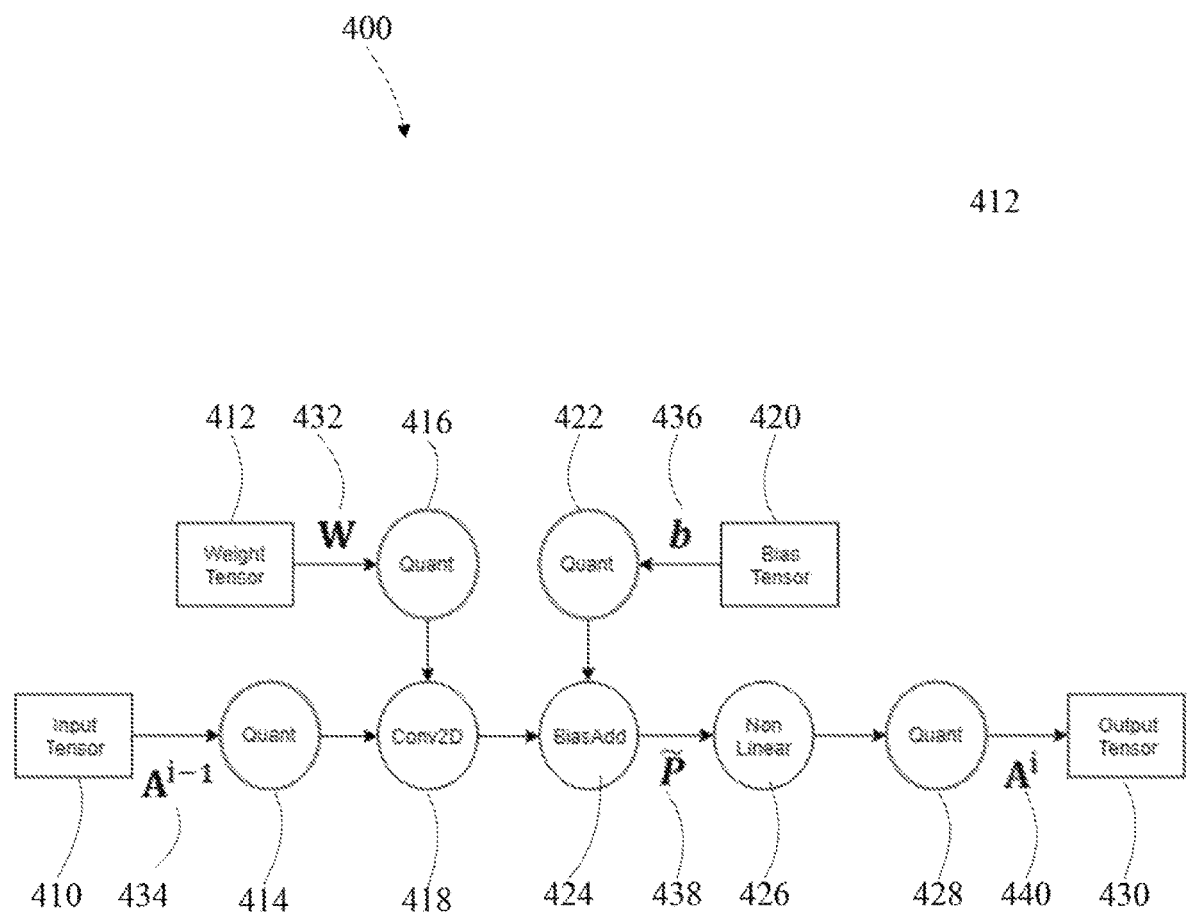

In the above implementation, the parameters $\{\overline{W}, z_W, z_{A^i}, \tilde{b}, n_1, n_2, \tilde{z}\}$ are computed offline. The software quantization library may compute the parameters by inserting quasi-quantization nodes into the original floating-point computational graph in the DL framework without replacing the original math-related operation kernels (2D convolutional layer (Conv2D), bias addition (BiasAdd), Non-linear), as shown in FIG. 4. The advantage is that the quantization library may be generally used in public frameworks without modifying numerous operation kernels implementation in various DL frameworks. Instead, the library may insert quasi-quantization nodes in proper positions in the computational graph. By carefully design the quasi-quantization nodes and the graph insertion pattern, bit-exact hardware deployment may be attained.

A statistical sample of the distribution of individual tensors allows the obtaining of the quantization tuple (s,z). With a representative dataset, forward-computing the floating-point model and samples the tensors in specific positions in the computation graph may be accomplished as shown in FIG. 4. The integer-formatted quantization parameters { $\ddot{W}$, $z_W$, $z_{A^i}$, $\tilde{b}$, $n_1$, $n_2$, $\tilde{z}$} may be calculated in the hardware implementation.

FIG. 4 depicts an example fused convolutional method, that includes, quantizing 414 an input tensor 410 $A^{i-1}$ 343 into a first power-of-two value. The method includes quantizing 416 a weight tensor 412 W 432 into a second power-of-two value and performing a convolution 418 based on the quantized input tensor and the quantized weight tensor. The method also includes quantizing 422 a bias tensor 420 b 436 into a third power-of-two value, bias-adding 424 an output of the convolution and the quantized bias tensor and outputting a bias-addition $\tilde{P}$ 438. The method non-linearizes 426 the output of the bias-addition and quantizes 428 the output of the non-linearization into an activation $A^i$ taking a form of a fourth power-of-two value output tensor 430.

Figure 5:
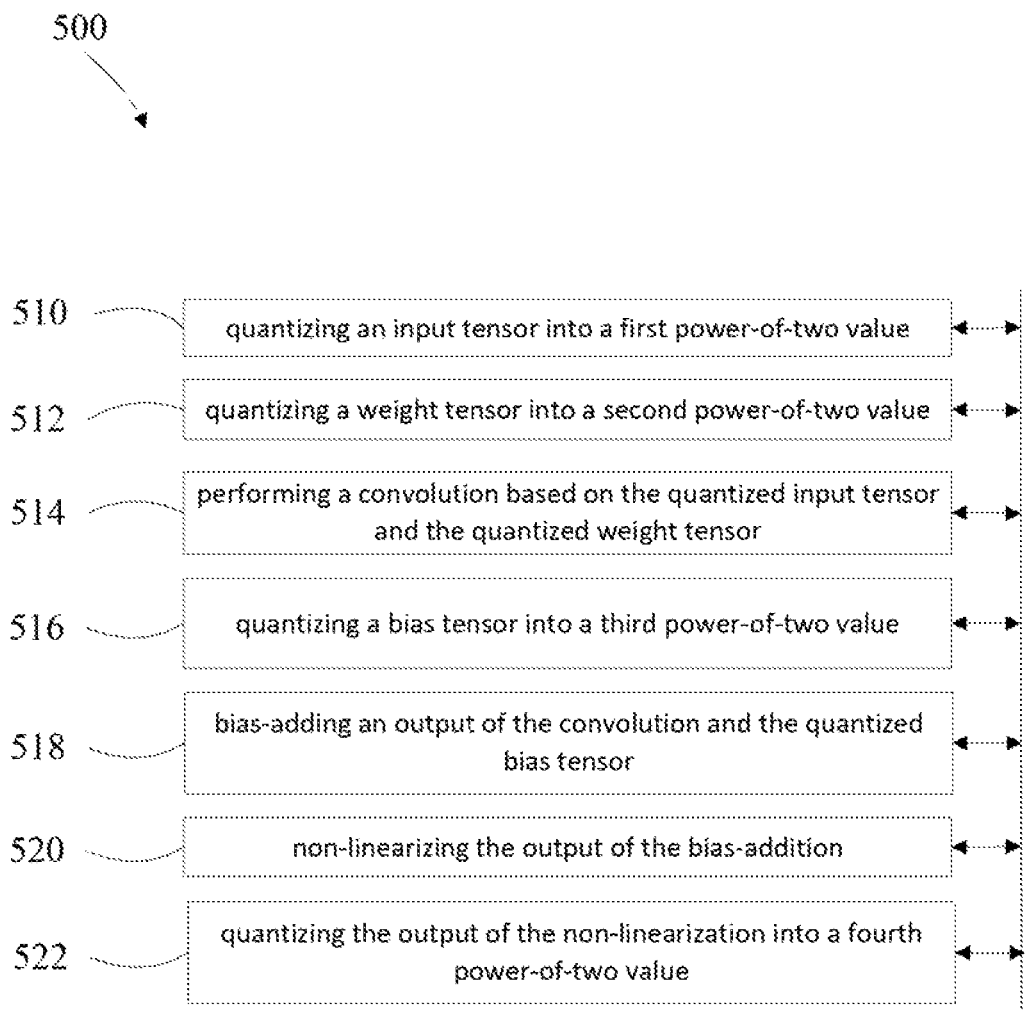

FIG. 5 depicts an example method of shift only normalization 500. The method includes quantizing 510 an input tensor into a first power-of-two value, quantizing 512 a weight tensor into a second power-of-two value and performing 514 a convolution based on the quantized input tensor and the quantized weight tensor. The method further includes quantizing 516 a bias tensor into a third power-of-two value, bias-adding 518 an output of the convolution and the quantized bias tensor and outputting a bias-addition, non-linearizing 520 the output of the bias-addition and quantizing 522 the output of the non-linearization into an activation taking a form of a fourth power-of-two value output tensor.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments" or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A fused convolutional layer, comprising:
   a comparator configured to receive a first zero point and a multiply-accumulation result;
   a first multiplexer coupled to the comparator, wherein the first multiplexer receives a plurality of power-of-two exponent values;
   a shift normalizer, coupled to the first multiplexer, wherein the shift normalizer is configured to receive the multiply-accumulation result and the plurality of power-of-two exponent values, wherein the shift normalizer limits a quantization of the multiply-accumulation result to a power-of-two scale; and
   a second multiplexer coupled to an output of the shift normalizer, wherein the first multiplexer receives a second zero point and outputs an activation.

2. The fused convolutional layer of claim 1, wherein the multiply-accumulation result is an integer variable.

3. The fused convolutional layer of claim 1, wherein the first zero point is fused.

4. The fused convolutional layer of claim 1, wherein the first zero point is an approximated integer variable.

5. The fused convolutional layer of claim 1, wherein the activation is an integer variable.

6. The fused convolutional layer of claim 1, wherein the quantization is one of symmetric, asymmetric, layer-wise, or channel-wise.

7. The fused convolutional layer of claim 1, wherein the activation is one of ReLU, pReLU, ReLUx, or hard-sigmoid.

* * * * *